United States Patent
Cho et al.

(10) Patent No.: US 11,908,993 B2
(45) Date of Patent: *Feb. 20, 2024

(54) METHOD FOR MANUFACTURING SOLID ELECTROLYTE MEMBRANE FOR ALL SOLID TYPE BATTERY AND SOLID ELECTROLYTE MEMBRANE MANUFACTURED BY THE METHOD

(71) Applicant: LG ENERGY SOLUTION, LTD., Seoul (KR)

(72) Inventors: Sung-Ju Cho, Daejeon (KR); Ho-Suk Shin, Daejeon (KR); Seung-He Woo, Daejeon (KR); Sung-Joong Kang, Daejeon (KR); Hyea-Eun Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,933

(22) Filed: Apr. 20, 2022

(65) Prior Publication Data

US 2022/0255117 A1 Aug. 11, 2022

Related U.S. Application Data

(63) Continuation of application No. 16/473,137, filed as application No. PCT/KR2018/005570 on May 15, 2018, now Pat. No. 11,342,578.

(30) Foreign Application Priority Data

May 15, 2017 (KR) .................. 10-2017-0060063

(51) Int. Cl.
*H01M 10/056* (2010.01)
*H01M 10/0525* (2010.01)
(Continued)

(52) U.S. Cl.
CPC ..... *H01M 10/056* (2013.01); *H01M 10/0525* (2013.01); *H01M 50/403* (2021.01);
(Continued)

(58) Field of Classification Search
CPC ............. H01M 10/056; H01M 50/409; H01M 10/0525; H01M 50/431; H01M 50/443; H01M 50/42; H01M 50/403
See application file for complete search history.

(56) References Cited

U.S. PATENT DOCUMENTS 5,437,692 A 8/1995 Dasgupta et al.
6,180,281 B1 1/2001 Schneider et al.
(Continued)

FOREIGN PATENT DOCUMENTS

CN 105470564 A 4/2016
JP H4-82186 A 3/1992
(Continued)

OTHER PUBLICATIONS

English machine translation of JP-2016-139482-A, published Aug. 4, 2016.
(Continued)

*Primary Examiner* — Sarah A. Slifka
(74) *Attorney, Agent, or Firm* — Birch, Stewart, Kolasch & Birch, LLP

(57) ABSTRACT

A solid electrolyte membrane and method of preparing, including a plurality of polymer filaments arranged crossed as a 3-dimensional structure in the form of a net of nonwoven fabric-like shape, and a plurality of inorganic solid electrolytes inserted and uniformly distributed in the structure. By this structural feature, a large amount of solid electrolyte particles are uniformly distributed and filled in the electrolyte membrane, contact between the particles is good, and ionic conduction paths are sufficiently provided.

(Continued)

Additionally, the durability of the solid electrolyte membrane is improved by the 3-dimensional structure, and the flexibility and strength increase. The nonwoven fabric composite solid electrolyte membrane has an effect in preventing inorganic solid electrolyte particle from being disconnected therefrom.

15 Claims, 4 Drawing Sheets

(51) Int. Cl.
  *H01M 50/431* (2021.01)
  *H01M 50/443* (2021.01)
  *H01M 50/42* (2021.01)
  *H01M 50/403* (2021.01)
  *H01M 50/489* (2021.01)
  *H01M 50/491* (2021.01)

(52) U.S. Cl.
  CPC ......... *H01M 50/42* (2021.01); *H01M 50/431* (2021.01); *H01M 50/443* (2021.01); *H01M 50/489* (2021.01); *H01M 50/491* (2021.01)

(56) References Cited

U.S. PATENT DOCUMENTS

| | | |
|---|---|---|
| 10,230,087 B2 | 3/2019 | Sato et al. |
| 2004/0253512 A1 | 12/2004 | Watanabe et al. |
| 2009/0214924 A1 | 8/2009 | Kotera et al. |
| 2010/0079959 A1 | 4/2010 | Letz |
| 2011/0165455 A1 | 7/2011 | Zhamu et al. |
| 2013/0337337 A1 | 12/2013 | Lee et al. |
| 2014/0295285 A1 | 10/2014 | Lee et al. |
| 2015/0132632 A1 | 5/2015 | Hwang et al. |
| 2015/0255768 A1 | 9/2015 | Konishi et al. |
| 2016/0079597 A1 | 3/2016 | Fujik et al. |
| 2016/0164138 A1 | 6/2016 | Han et al. |

FOREIGN PATENT DOCUMENTS

| | | |
|---|---|---|
| JP | 2928551 B2 | 8/1999 |
| JP | 2000-133310 A | 5/2000 |
| JP | 2000-215915 A | 8/2000 |
| JP | 2005-5024 A | 1/2005 |
| JP | 2005-129272 A | 5/2005 |
| JP | 2007-18995 A | 1/2007 |
| JP | 2011-91005 A | 5/2011 |
| JP | 2012-504322 A | 2/2012 |
| JP | 2014-96311 A | 5/2014 |
| JP | 2015-153460 A | 8/2015 |
| JP | 2015-213007 A | 11/2015 |
| JP | 2016-139482 A | 8/2016 |
| JP | 2018-31789 A | 3/2018 |
| KR | 10-2013-0142224 A | 12/2013 |
| KR | 10-2015-0050518 A | 5/2015 |
| KR | 10-2015-0051556 A | 5/2015 |
| KR | 10-2016-0013631 A | 2/2016 |
| KR | 10-1601511 B1 | 3/2016 |
| KR | 10-2016-0068464 A | 6/2016 |
| WO | WO 02/078114 A1 | 10/2002 |
| WO | WO 2014/123033 A1 | 8/2014 |

OTHER PUBLICATIONS

International Search Report issued in PCT/KR2018/005570 (PCT/ISA/210), dated Sep. 6, 2018.

FIG. 4 – Conventional Art
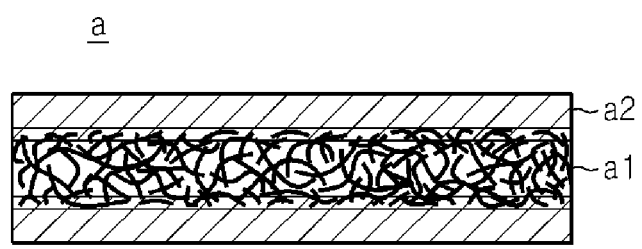

METHOD FOR MANUFACTURING SOLID ELECTROLYTE MEMBRANE FOR ALL SOLID TYPE BATTERY AND SOLID ELECTROLYTE MEMBRANE MANUFACTURED BY THE METHOD

This application is a Continuation of application Ser. No. 16/473,137 filed on Jun. 24, 2019, which is the U.S. National Phase of PCT/KR2018/005570, filed May 15, 2018, and which claims priority under 35 U.S.C. § 119(e) to Application No. 10-2017-0060063 filed in Korea on May 15, 2017, the entire contents of all of which are expressly incorporated by reference into the present application.

TECHNICAL FIELD

The present application claims priority to Korean Patent Application No. 10-2017-0060063 filed in the Republic of Korea on May 15, 2017, the disclosure of which is incorporated herein by reference. The present disclosure relates to a solid electrolyte membrane for an all solid type battery for preventing solid electrolyte particle from being disconnected therefrom and improving durability and a method for manufacturing the same.

BACKGROUND ART

Lithium ion secondary batteries are being widely used as a power source device for portable electronic devices. Additionally, there is a recent movement toward the use of lithium ion secondary batteries in applications of electric vehicles or industrial batteries. The structure of lithium ion secondary batteries is relatively simple; their three elements are a negative electrode active material, a positive electrode active material and an electrolyte solution. Batteries work by movements of lithium ions from the positive electrode to the negative electrode and from the negative electrode to the positive electrode. The electrolyte part only acts as a lithium ionic conductor. The widely used lithium ion secondary batteries use an electrolyte solution in which a lithium salt is dissolved in a non-protonic organic solvent. However, this electrolyte solution has a potential problem in use due to electrolyte solution leakage or gas generation, and to solve this problem, there is a need for development of all solid type batteries.

All solid type batteries using solid electrolytes have (1) improved safety, (2) battery with optimized structure, (3) high energy density and (4) high output density advantages, compared to batteries using liquid electrolytes. In general, an all solid type battery has a sheet type solid electrolyte interposed between the positive electrode and the negative electrode. The sheet type solid electrolyte is generally used by making a mixture of inorganic solid electrolyte particles and binder resin into the shape of a sheet. However, the solid electrolyte sheet including particles linked by binder resin has a problem with solid electrolyte particle disconnection. Meanwhile, a method whereby a nonwoven fabric is impregnated with a slurry including solid electrolyte particles has been proposed, but the solid electrolyte particles are not inserted into the center within the nonwoven fabric well and the particles are only disposed in the superficial part of the nonwoven fabric, so the inner part of the nonwoven fabric is not sufficiently filled. Accordingly, the solid electrolyte particles do not contact each other and they are separately disposed in the upper part and lower part of the nonwoven fabric, and thus the ionic conductivity is not high. Additionally, among particles that are not impregnated and stay in the superficial part of the nonwoven fabric, inorganic solid electrolyte particle is disconnected form the electrolyte membrane. FIG. 4 schematically shows a solid electrolyte membrane proposed earlier (a), and referring to FIG. 4, a solid electrolyte slurry (a2) is applied to the surface of a nonwoven fabric (a1) and pushed in, but the solid electrolyte slurry is not inserted all along the thicknesswise direction of the nonwoven fabric and large amounts stay in the surface of the nonwoven fabric. Accordingly, development of a solid electrolyte membrane for improving the mechanical strength and flexibility and preventing particle disconnection is required.

DISCLOSURE

Technical Problem

The present disclosure is directed to providing a method for manufacturing a new solid electrolyte membrane for an all solid type battery for increasing ionic conductivity, preventing inorganic solid electrolyte particle from being disconnected therefrom, and improving flexibility and durability. In addition, it is apparent that the objects and advantages of the present disclosure may be realized by the means or method set forth in the appended claims and combinations thereof.

Technical Solution

The present disclosure relates to a solid electrolyte membrane for an all solid type battery for solving the above-described problem and a method for manufacturing the same.

A first aspect of the present disclosure relates to the above-described solid electrolyte membrane, and the solid electrolyte membrane includes a plurality of inorganic solid electrolytes and a plurality of polymer filaments, wherein the plurality of polymer filaments are entangled and arranged crossed and linked to form a 3-dimensional mesh structure, and the mesh structure is filled with the inorganic solid electrolyte particles along a thicknesswise direction.

According to a second aspect of the present disclosure, in the first aspect, the plurality of polymer filaments include one type of polymer material selected from the group consisting of polyolefin, polyester, polyamide, polyacetal, polycarbonate, polyimide, polyetherketone, polyethersulfone, polyphenyleneoxide, polyphenylenesulfide, polyvinyledene fluoride, polyvinyl chloride, polyacrylonitrile, cellulose, polyparaphenylenebenzobisoxazole, and mixtures thereof.

According to a third aspect of the present disclosure, in any one of the first and second aspects, the plurality of inorganic solid electrolytes includes a particle type including at least one of primary particles and secondary particles, the secondary particles including an agglomeration of primary particles.

According to a fourth aspect of the present disclosure, in any one of the first to third aspects, the plurality of polymer filaments have a diameter of 100 nm to 2 μm.

According to a fifth aspect of the present disclosure, in any one of the first to fourth aspects, the plurality of inorganic solid electrolytes include at least one of an oxide-based solid electrolyte and a sulfide-based solid electrolyte.

According to a sixth aspect of the present disclosure, in any one of the first to fifth aspects, the plurality of inorganic solid electrolytes and the plurality of polymer filaments are included in the solid electrolyte membrane at a weight ratio of 99:1 to 30:70.

A seventh aspect of the present disclosure relates to a method for manufacturing a solid electrolyte membrane for an all solid type battery, and the method includes preparing a nonwoven fabric precursor in which a plurality of polymer filaments are gathered, preparing a solid electrolyte membrane-forming slurry, obtaining a mixture in which the nonwoven fabric precursor and the solid electrolyte membrane-forming slurry are mixed, drying the mixture to obtain a preliminary solid electrolyte membrane, and pressing the preliminary solid electrolyte membrane to obtain a solid electrolyte membrane.

According to an eighth aspect of the present disclosure, in the seventh aspect, the plurality of polymer filaments are obtained by spinning by an electrospinning method.

Advantageous Effects

The method for manufacturing a solid electrolyte membrane for an all solid type battery according to the present disclosure inserts a solid electrolyte membrane-forming slurry into a nonwoven fabric precursor before nonwoven fabric compression so that the solid electrolyte is uniformly filled in 3-dimensional mesh structure of polymer filaments, and its fill ratio is high. Accordingly, a larger amount of inorganic solid electrolyte substances can be uniformly distributed in the solid electrolyte membrane than a general filling method involving press-inserting inorganic solid electrolyte particles into a compressed nonwoven fabric, and accordingly, ionic conduction paths are sufficiently formed by contact of the solid electrolyte particles and the ionic conductivity is good. In addition, solid electrolyte particle is less likely to be disconnected from the solid electrolyte membrane, and 3-dimensional mesh structure increases durability and flexibility and prevents shape deformation.

BRIEF DESCRIPTION OF THE DRAWINGS

The accompanying drawings illustrate a preferred embodiment of the present disclosure, and together with the above detailed description, serve to provide further understanding of the technical aspects of the present disclosure, and thus, the present disclosure should not be construed as being limited to the drawings. Meanwhile, the shape, size, scale or proportion of the elements in the drawings as used herein may be exaggerated to emphasize more clear description.

FIG. 4 shows schematically a cross section of a conventional solid electrolyte membrane.

MODE FOR CARRYING OUT THE INVENTION

Figure 1:
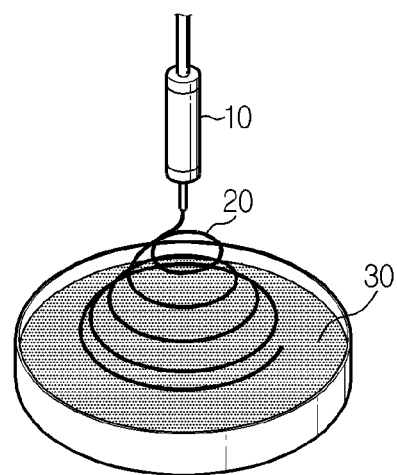
FIG. 1 shows schematically an electrospinning process according to an embodiment of the present disclosure.

Hereinafter, the present disclosure will be described in detail. Prior to the description, it should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation. Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time the application was filed.

The term [comprises] when used in this specification, specifies the presence of stated elements, but does not preclude the presence or addition of one or more other elements, unless the context clearly indicates otherwise.

The terms [about] and [substantially] are used herein in the sense of at, or nearly at, when given the manufacturing and material tolerances inherent in the stated circumstances and are used to prevent the unscrupulous infringer from unfairly taking advantage of the invention disclosure where exact or absolute figures are stated as an aid to understanding the invention.

[A and/or B] when used in this specification, specifies [either A or B or both].

In the following detailed description of the present disclosure, specific terms are used for convenience and are not limiting. The terms 'right', 'left' top' and 'bottom' refer to the directions in the drawings to which reference is made. The terms 'inward' and 'outward' refer to the directions toward or away from the geometrical centers of the designated devices, systems and members thereof. The terms 'front', 'rear', 'up', 'down' and related words and phrases refer to the locations and directions in the drawings to which reference is made and are not limiting. These terms include the above-listed words, derivatives thereof and synonyms thereof.

The present disclosure relates to a solid electrolyte membrane for an all solid type battery and an electrochemical device including the same. Additionally, the present disclosure relates to a method for manufacturing the solid electrolyte membrane. The electrochemical device may be, for example, a lithium ion secondary battery, and in particular, may be an all solid type battery using either a polymer electrolyte or an inorganic solid electrolyte or both as an electrolyte material.

The solid electrolyte membrane according to the present disclosure includes a mix phase of fine fibrous polymer materials or polymer filaments, and a solid electrolyte. In an embodiment of the present disclosure, the solid electrolyte may include at least one of a polymer-based solid electrolyte and an inorganic solid electrolyte. Meanwhile, the solid electrolyte membrane may further include binder resin.

In the solid electrolyte membrane, the polymer filaments are entangled and arranged cross and linked together to form a 3-dimensional mesh structure. In a particular embodiment of the present disclosure, the 3-dimensional mesh structure may show a nonwoven fabric-like structure formed by entanglement of a plurality of polymer filaments. That is, the 3-dimensional mesh structure is a 3-dimensional structure of the fibrous polymer materials arranged cross, and may show a shape of a 3-dimensional mesh. Additionally, in a particular embodiment of the present disclosure, the solid electrolyte is inserted into the structure using the mesh structure as a support and fills the mesh structure. In an embodiment of the present disclosure, the solid electrolyte is filled with high density such that the solid electrolyte particles are densely packed in the solid electrolyte membrane, and accordingly, the porosity of the solid electrolyte membrane is as low as 15% or less, and preferably 10% or less. In an embodiment of the present disclosure, the solid electrolyte may be included such that it is coated on the outer surface of the mesh structure of the solid electrolyte membrane in whole or at least in part. In a particular embodiment of the present disclosure, the polymer filaments may be obtained by spinning polymer materials by an electrospinning method, and for example, the polymer filaments may be obtained by a wet spinning method that feeds filaments from a polymer solution containing dissolved polymer materials into water or alcohol having a small number of carbon atoms, for example, methanol or ethanol using an electrospinning method. However, the polymer filaments are not limited to only those formed by the above-described method.

In an embodiment of the present disclosure, the 3-dimensional mesh structure in which the polymer filaments are entangled may have a nonwoven fabric-like structure. In a particular embodiment of the present disclosure, the solid electrolyte membrane is a complex including a mix phase formed by filling a plurality of inorganic solid electrolyte particles in the 3-dimensional mesh structure of nonwoven fabric-like structure. In the solid electrolyte membrane, a large amount of solid electrolyte particles are uniformly distributed and filled in the pores of the 3-dimensional mesh structure, and contact between particles is good and ionic conduction paths can be sufficiently provided. Additionally, durability of the solid electrolyte membrane is improved by the 3-dimensional mesh structure acting as a support, the flexibility and strength increase, and there is an effect in preventing inorganic solid electrolyte particle from being disconnected from the solid electrolyte membrane. Particularly, there is a reduction in solid electrolyte membrane tear and consequential disconnection of solid electrolyte particle from the electrolyte membrane even though shape deformation, for example, folding or bending, occurs in the solid electrolyte membrane. Additionally, as described below, the solid electrolyte membrane according to the present disclosure is obtained by spinning polymer filaments and filling the resultant filament aggregates with a solid electrolyte, followed by compression. Accordingly, the 3-dimensional mesh structure can be filled with a larger amount of solid electrolytes therein than general nonwoven fabrics, ensuring high ionic conductivity.

In a particular embodiment of the present disclosure, the plurality of inorganic solid electrolyte particles and the polymer filaments in the solid electrolyte membrane are linked and/or attached to each other to form a membrane unit. When the solid electrolyte membrane includes binder resin, the binder resin may assist in their linking.

In an embodiment of the present disclosure, the diameter of the polymer filaments may be 100 nm to 2 μm, and in the above-described range, the diameter may be 300 nm or more, 500 nm or more, 700 nm or more, 1 μm or more, 1.3 μm or more, 1.5 μm or more, or 1.7 μm or more, or the diameter may be 1.8 μm or less, 1.5 μm or less, 1.2 μm or less, 1 μm or less, 800 nm or less, or 500 nm or less.

Additionally, in a particular embodiment of the present disclosure, an aspect ratio of the polymer filaments may be more than 1, and for example, the length may be 5 μm to 500 μm. In an embodiment of the present disclosure, the length of the filaments may be, in the above-described range, 10 μm or more, 50 μm or more, 100 μm or more, 200 μm or more, 300 μm or more, or 400 μm or more, or the length may be, in the above-described range, 400 μm or less, 300 μm or less, 200 μm or less, 100 μm or less, 50 μm or less, or 30 μm or less. In an embodiment of the present disclosure, the diameter and length of the filaments can be identified through shape observation through SEM image analysis.

The polymer material include, without limitation, any type of polymer material that can be used in a general nonwoven fabric manufacturing process and is likely to be spun into filaments having the above-described range of diameters and lengths by electrospinning, and may include appropriate polymer materials according to the purpose of use of the solid electrolyte membrane.

In a particular embodiment of the present disclosure, the polymer material may be thermoplastic resin and/or thermosetting resin. Its non-limiting example may include one selected from the group consisting of polyolefin including polyethylene and polypropylene, polyester including polyethyleneteraphthalate, polybutyleneterephthalate and polyparaphenylenebenzobisoxazole, polyamide including aramid, polyacetal, polycarbonate, polyimide, polyetherketone, polyethersulfone, polyphenyleneoxide, polyphenylenesulfide, polyethylenenaphthalene, polytetrafluoroethylene, polyvinyledene fluoride, polyvinyl chloride, polyacrylonitrile, cellulose, nylon, polyacrylate and glass, or mixtures thereof.

In a particular embodiment of the present disclosure, the inorganic solid electrolyte is not limited to a particular type of substance and may include those commonly used in all solid type batteries, and may be properly selected and used according to battery characteristics.

In a particular embodiment of the present disclosure, the inorganic solid electrolyte is not limited to a particular type of substance, and may include at least one of inorganic solid electrolytes such as a crystalline solid electrolyte, a non-crystalline solid electrolyte and a glass ceramic solid electrolyte. In the present disclosure, the solid electrolyte may include at least one of an oxide-based solid electrolyte and a sulfide-based solid electrolyte. In an embodiment, the sulfide-based solid electrolyte may include, for example, lithium sulfide, silicon sulfide, germanium sulfide and boron sulfide. Specific examples of the inorganic solid electrolyte are LLTO-based compound $(La,Li)TiO_3$), $Li_6La_2CaTa_2O_{12}$, $Li_6La_2ANb_2O_{12}$ (A=Ca, Sr), $Li_2Nd_3TeSbO_{12}$, $Li_3BO_{2.5}N_{0.5}$, $Li_9SiAlO_8$, LAGP-based compound $(Li_{1+x}Al_xGe_{2-x}(PO_4)_3$, where $0 \le x \le 1$, $0 \le y \le 1$), LATP-based compound $(Li_{1+x}Al_xTi_{2-x}(PO_4)_3$, where $0 \le x \le 1$, $0 \le y \le 1$) such as $Li_2O$—$Al_2O_3$—$TiO_2$—$P_2O_5$, $Li_{1+x}Ti_{2-x}Al_xSi_y(PO_4)_{3-y}$ (where $0 \le x \le 1$, $0 \le y \le 1$), $LiAl_xZr_{2-x}(PO_4)_3$ (where $0 \le x \le 1$, $0 \le y \le 1$), $LiTi_xZr_{2-x}(PO_4)_3$ (where $0 \le x \le 1$, $0 \le y \le 1$), LPS-based compound such as $Li_2S$—$P_2S_5$, $Li_{3.833}Sn_{0.833}As_{0.166}S_4$, $Li_4SnS_4$, $Li_{3.25}Ge_{0.25}P_{0.75}S_4$, $B_2S_3$—$Li_2S$, $xLi_2S$-$(100-x)P_2S_5$ (x is 70~80), $Li_2S$—$SiS_2$—$Li_3N$, $Li_2S$—$P_2S_5$—LiI, $Li_2S$—$SiS_2$—LiI, $Li_2S$—$B_2S_3$—LiI, $Li_3N$, LISICON, LIPON-based compound $(Li_{3+y}PO_{4-x}N_x$, where $0 \le x \le 1$, $0 \le y \le 1$), Thio-LISICON-based compound such as $Li_{3.25}Ge_{0.25}P_{0.75}S_4$, perovskite-based compound $((La, Li)TiO_3)$, NASICON-based compound such as $LiTi_2(PO_4)_3$ and LLZO-based compound including lithium, lanthanum, zirconium and oxygen as components, and may include one or more of these.

In an embodiment of the present disclosure, the inorganic solid electrolyte may be in the form of particles, and the particles may include at least one type of primary particles and secondary particles formed by agglomeration of primary particles. Additionally, the inorganic solid electrolyte particles may have the particle size ranging from 200 nm to 5 μm.

In a particular embodiment of the present disclosure, the inorganic solid electrolyte and the polymer filaments (non-woven fabric precursor) may be included in the solid electrolyte membrane at a weight ratio (weight %) of about 99:1 to 30:70. The content of the inorganic solid electrolyte in the solid electrolyte membrane may be 90 weight % or less, 85 weight % or less, 75 weight % or less, 65 weight % or less, 60 weight % or less, or the content of the inorganic solid electrolyte may be, in the above-described range, 40 weight % or more, 50 weight % or more, 60 weight % or more, 70 weight % or more, 80 weight % or more and 90 weight % or more. When the content of the inorganic solid electrolyte in the solid electrolyte membrane is 30 weight % or less, there is a high possibility that electrolyte particles are spaced apart from each other in the solid electrolyte membrane, failing to sufficiently provide ionic conduction paths.

The binder resin provides the bond strength between the membrane components in the solid electrolyte membrane, and may include, without limitation, PVdF-based binder resin or acrylic binder resin that is used as a binder in the field of electrochemical devices. Meanwhile, in a particular embodiment of the present disclosure, when the solid electrolyte is a sulfide-based solid electrolyte, a dispersant of the slurry preferably includes a non-polar solvent with the polarity index of 3 or less, and in this instance, the binder resin preferably includes rubber-based binder resin in view of solubility. The rubber-based binder resin may include at least one selected from the group consisting of natural rubber, butyl-based rubber, bromo-butyl-based rubber, chlorinated butyl-based rubber, styrene isoprene-based rubber, styrene-ethylene-butylene-styrene-based rubber, acrylonitrile-butadiene-styrene-based rubber, polybutadiene-based rubber, nitrile butadiene-based rubber, styrene butadiene-based rubber, styrene butadiene styrene-based rubber (SBS) and ethylene propylene diene monomer (EPDM)-based rubber. In a particular embodiment of the present disclosure, the binder resin may be present in an amount of 1 to 10 weight % in the solid electrolyte membrane and its content may be properly adjusted to 7 weight % or less, 5 weight % or less, and 3 weight % or less.

In a particular embodiment of the present disclosure, the thickness of the solid electrolyte membrane may be 10 μm to 700 μm. However, the thickness is not particularly limited to the above-described range and may be properly controlled, taking into account the final purpose (battery characteristics, etc.).

Additionally, in a particular embodiment of the present disclosure, the solid electrolyte membrane preferably has a very low porosity of 10 vol % or less, 8 vol % or less, or 3 vol % or less, or close to 0 vol %, or together with this or independently, has indefinitely measured or immeasurable air permeability. For example, the air permeability of the solid electrolyte membrane is in the range of 3,000 sec/100 cc or above.

In a particular embodiment of the present disclosure, the term 'air permeability' refers to the time during which 100 cc air passes through the electrolyte membrane. It may be measured in accordance with JIS P8117. Accordingly, the air permeability P1 measured in the electrolyte membrane having the thickness T1 may be converted to the air permeability P2 when the electrolyte membrane is 20 μm thick by the equation: $P2=(P1\times20)/T1$. Its unit is sec/100 cc, and it may be interchangeably used with the air permeance and commonly indicated by the Gurely value. Meanwhile, the porosity may be measured using BEL JAPAN BELSORP (BET instrument) using adsorption gas such as nitrogen or by a method such as mercury intrusion porosimetry. Alternatively, in an embodiment of the present disclosure, after calculating the net density of the electrolyte membrane from the density (apparent density) of the obtained electrolyte membrane, a composition ratio of materials included in the electrolyte membrane and the density of each component, the porosity of the electrolyte membrane may be calculated from a difference between the apparent density and the net density.

Figure 2:
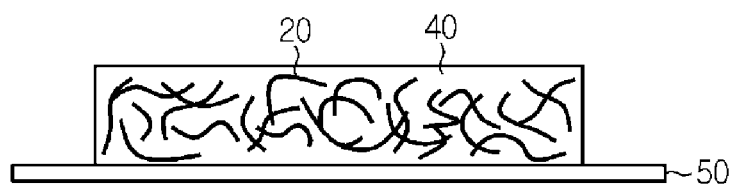
FIG. 2 shows exemplarily a mixture of polymer filaments and a solid electrolyte-forming slurry coated on a release plate.
Figure 3:
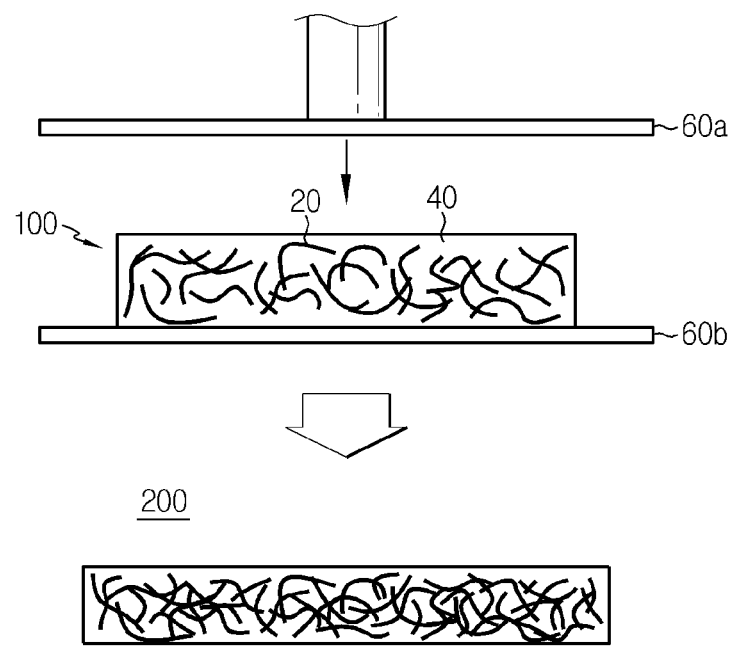
FIG. 3 shows schematically a pressing process according to an embodiment of the present disclosure.

Additionally, the present disclosure provides a method for manufacturing the solid electrolyte membrane having the above-described feature. FIGS. 1 to 3 are a process flowchart showing the process sequence of the method for manufacturing an electrolyte membrane according to the present disclosure. The method for manufacturing an electrolyte membrane according to the present disclosure is described in detail with reference to FIGS. 1 to 3.

The method for manufacturing an electrolyte membrane according to the present disclosure includes (S10) to (S50) as follows:

(S10) preparing a nonwoven fabric precursor in which polymer filaments are gathered;

(S20) preparing a solid electrolyte membrane-forming slurry;

(S30) obtaining a mixture in which the nonwoven fabric precursor obtained in the (S10) and the slurry are mixed;

(S40) drying the mixture to obtain a preliminary solid electrolyte membrane; and (S50) pressing the preliminary solid electrolyte membrane to obtain a solid electrolyte membrane.

Among the steps, (S10) and (S20) may not be performed in a sequential order, and may be performed at the same time, or the process of (S10) may be performed after the process of (S20) is performed.

First, a nonwoven fabric precursor in which polymer filaments are gathered is prepared (S10). In the present disclosure, the term 'nonwoven fabric precursor' represents that polymer microfilaments spun to make a nonwoven fabric are simply deposited or gathered and are not pressed to link the filaments together. In a particular embodiment of the present disclosure, the spinning of filaments may be performed by an electrospinning method. The electrospinning is a method that obtains fibers of continuous phase having a few nm of diameter at a minimum using an electric field. An electrospinning apparatus generally includes a high voltage power supply, a spinneret and a collector to collect fibers. During electrospinning, a polymer solution and the collector are electrically charged on the opposite electrodes. The polymer solution fed through the nozzle end is stretched in a conic shape (taylor) by an electromagnetic repulsive force and a Coulomb force under the applied voltage and spun in the form of filaments, and fibers are collected in the collector. When electrospinning is used, filaments can be finely formed on a few tens to a few hundreds of nano level by controlling the spinning process including the aperture of the spinning nozzle and the voltage and/or current range, and thus, it is advantageous for the formation of a nonwoven fabric having high porosity.

Meanwhile, in a particular embodiment of the present disclosure, the electrospinning is preferably wet spinning by which spun filaments are gathered and/or deposited in a solution. When filaments are gathered by a wet spinning method, the gathered filaments are compressed such that the filaments are not entangled and they are uniformly distributed in a solution until a nonwoven fabric is formed, and thus it is advantageous for uniform pore formation. For example, when a nonwoven fabric precursor is prepared by a wet spinning method, a polymer material (e.g., polyacrylonitrile) as described above is dissolved in an appropriate dispersion medium, for example, DMF, to prepare a polymer solution, which is then spun into microfilaments in a coagulant solution such as water, methanol or ethanol, and the filaments gathered as a result of spinning are collected, obtaining a nonwoven fabric precursor. Additionally, the nonwoven fabric precursor may go through additional freeze-drying to dry the solvent such as the dispersion medium or the coagulant solution.

FIG. 1 shows an electrospinning process according to an embodiment of the present disclosure, showing schematically the polymer filament 20 fed from the spinning apparatus 10 into the coagulant solution 30.

Subsequently, a solid electrolyte membrane-forming slurry is prepared (S20). The slurry may be prepared by dispersing solid electrolyte membrane materials including inorganic solid electrolyte particles in an appropriate solvent including one selected from xylene, cyclopentane, cyclohexane, hexane, anhydrous hexane, toluene, ether, tertiary alcohol, secondary amine and tertiary amine, or mixtures thereof. The electrolyte membrane material may further include binder resin as described above. In a particular embodiment of the present disclosure, the slurry may be prepared by mixing solids including oxide-based solid electrolyte particles, for example, LAGP and binder resin with anhydrous xylene at a weight ratio of 10:90 to 50:50 and performing mortar mixing. The mixing method may include general mixing methods including mortar mixing, and is not particularly limited to a type of method.

Subsequently, a mixture in which the nonwoven fabric precursor obtained in (S10) and the solid electrolyte membrane-forming slurry are mixed is obtained (30). The mixture may be prepared by impregnating the nonwoven fabric precursor with the slurry so that the nonwoven fabric precursor is filled with the slurry. Through this step, the inorganic solid electrolyte is filled in pores formed in the nonwoven fabric precursor. In an embodiment of the present disclosure, the mixture may be prepared in the form of a dispersion in which the components are uniformly dispersed by mixing the nonwoven fabric precursor and the slurry. In an embodiment of the present disclosure, the mixing of the nonwoven fabric precursor and the slurry may be performed by a mechanical (physical) mixing method. The mechanical mixing method is not particularly limited to a type of method, and may be properly selected from at least one of manual mixing and automatic mixing methods. For example, the mixing may be performed by putting the mixture into a mortar having a predetermined volume and mixing (mortar mixing) using a pestle, and besides, general screw-type, impeller-type, paddle-type and hammer-type mixers may be properly selected and used. The nonwoven fabric precursor is such that filaments are gathered loosely and irregularly like cotton, and by this mixing process, the slurry may penetrate the pores between the filaments of the nonwoven fabric precursor, and the nonwoven fabric precursor having low mechanical strength may partially break up and may be mixed with the slurry to become a slurry.

In a particular embodiment of the present disclosure, the mixture may be prepared so that it is coated on a release plate such as a PET film to a predetermined thickness and introduced in a subsequent process, for example, a drying process. The release plate is removed after performing a pressing step as described below. FIG. 2 shows exemplarily the mixture of the polymer filaments 20 and the solid electrolyte membrane-forming slurry 40 coated on the surface of the release plate 50.

The nonwoven fabric precursor is before the spun filaments are compressed and thus has a larger pore size than the nonwoven fabric obtained after compression. Accordingly, when the nonwoven fabric precursor is filled with the slurry, there is an effect of improvement in the fill ratio compared to the finished nonwoven fabric and it is very advantageous for very uniform dispersed phase of the components, the inorganic solid electrolyte particles and the binder, in the finally prepared electrolyte membrane.

Subsequently, the mixture is dried to obtain a preliminary solid electrolyte membrane (S40). In the drying step, the solvent in the slurry is removed, and dry solids (preliminary solid electrolyte membrane) are obtained, in which solids including the inorganic solid electrolyte particles and the filaments in the slurry are linked with a mechanically low strength. When the slurry includes binder resin, the binder resin assists in their linking. In the above step, the drying method is not limited to a particular type. The drying is preferably performed under the temperature and time conditions in which composition change or degradation of the components does not occur, and the drying may be performed in room temperature or heated condition as needed. Additionally, hot air or cool air may be added as needed.

Subsequently, the preliminary solid electrolyte membrane 100 is pressed (S50). In a particular embodiment of the present disclosure, appropriate pressure may be applied, taking into account the porosity of the solid electrolyte membrane 200 finally obtained. In a particular embodiment of the present disclosure, the pressure ranging from 100 MPa to 1,000 MPa may be applied. The linking of the components of the electrolyte membrane can be tightly maintained by the applied pressure, and thus the structure of the solid electrolyte membrane can be stabilized and exhibit desired porosity. In an embodiment of the present disclosure, at least one of known pressing apparatuses such as a hot press and a hydraulic press may be properly selected and used, and the hot press may be adjusted to the range of 50° C. to 150° C., but is not particularly limited thereto. FIG. 3 shows schematically a pressing process according to an embodiment of the present disclosure, and with reference to FIG. 3, the preliminary solid electrolyte membrane 100 as a result of drying is pressed down by a top pressing apparatus 60a while being supported on a support 60b of the pressing apparatus to prepare the solid electrolyte membrane 200.

The solid electrolyte membrane for an all solid type battery according to the present disclosure has a very high fill ratio of the slurry because the nonwoven fabric precursor before compression of the nonwoven fabric is filled with the electrolyte membrane-forming slurry so that the slurry can be uniformly filled in the nonwoven fabric precursor. Accordingly, the solid electrolyte membrane according to the present disclosure may exhibit a high level of ionic conductivity due to impregnation with a larger amount of inorganic solid electrolyte particles than an electrolyte membrane manufactured by filling a slurry in a general nonwoven fabric material prepared by compressing filament aggregates. Accordingly, the solid electrolyte membrane manufactured according to the manufacturing method of the present disclosure has uniform and high ionic mobility over the entire electrolyte membrane.

Additionally, the electrolyte membrane manufactured by the above-described method exhibits flexibility and rigidity simultaneously, is less likely to deform, and has improved durability against an external force applied to the battery. Moreover, it is possible to prevent the inorganic solid electrolyte particle from being disconnected.

Meanwhile, the present disclosure provides an all solid type battery including the solid electrolyte membrane. The all solid type battery includes a negative electrode, a positive electrode and a solid electrolyte membrane interposed between the negative electrode and the positive electrode, and the solid electrolyte membrane has the above-described feature.

In a particular embodiment of the present disclosure, the positive and negative electrodes include a current collector and an electrode active material layer formed on at least one surface of the current collector. The electrode active material layer includes an electrode active material, a solid electrolyte, a binder (binder resin) and a conductive material.

In the present disclosure, when the electrode is a positive electrode, a positive electrode active material may include one of layered compound such as lithium manganese composite oxide ($LiMn_2O_4$, $LiMnO_2$, etc.), lithium cobalt oxide ($LiCoO_2$) and lithium nickel oxide ($LiNiO_2$) or compound with one or more transition metal substitution; lithium manganese oxide of chemical formula $Li_{1+x}Mn_{2-x}O_4$ (where x is 0~0.33), $LiMnO_3$, $LiMn_2O_3$, $LiMnO_2$; lithium copper oxide ($Li_2CuO_2$); vanadium oxide such as $LiV_3O_8$, $LiFe_3O_4$, $V_2O_5$, $Cu_2V_2O_7$; Ni site type lithium nickel oxide represented by chemical formula $LiNi_{1-x}M_xO_2$ (where M=Co, Mn, Al, Cu, Fe, Mg, B or Ga, x=0.01~0.3); lithium manganese composite oxide represented by chemical formula $LiMn_{2-x}M_xO_2$ (where M=Co, Ni, Fe, Cr, Zn or Ta, x=0.01~0.1) or $Li_2Mn_3MO_8$ (where M=Fe, Co, Ni, Cu or Zn); $LiMn_2O_4$ with partial substitution of alkali earth metal ion for Li in chemical formula; disulfide compound; and $Fe_2(MoO_4)_3$, or mixtures thereof.

In the present disclosure, when the electrode is a negative electrode, a negative electrode active material may include one selected from lithium metal oxide, carbon such as non-graphitizable carbon and graphite-based carbon; metal composite oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Groups 1, 2 and 3 elements in the periodic table, halogen; $0 \leq x \leq 1$; $1 \leq y \leq 3$; $1 \leq z \leq 8$); lithium metal; lithium alloy; silicon-based alloy; tin-based alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymer such as polyacetylene; Li—Co—Ni-based material; and titanium oxide, or mixtures thereof.

The binder (binder resin) may include rubber-based binder resin. PVdF-based binder resin or acrylic binder resin used for the electrode binder has low solubility in a non-polar solvent, and thus is difficult to prepare an electrode slurry. Accordingly, the present disclosure uses rubber-based resin having high solubility in a non-polar solvent for the binder. In an embodiment of the present disclosure, the rubber-based binder resin may include at least one selected from the group consisting of natural rubber, butyl-based rubber, bromo-butyl-based rubber, chlorinated butyl-based rubber, styrene isoprene-based rubber, styrene-ethylene-butylene-styrene-based rubber, acrylonitrile-butadiene-styrene-based rubber, polybutadiene-based rubber, nitrile butadiene-based rubber, styrene butadiene-based rubber, styrene butadiene styrene-based rubber (SBS) and ethylene propylene diene monomer (EPDM)-based rubber.

In a particular embodiment of the present disclosure, the solid electrolyte may include those commonly used as solid electrolyte materials of all solid type batteries and is not limited to a particular substance. The solid electrolyte may include at least one of a polymer-based solid electrolyte material and an inorganic solid electrolyte material showing ionic conductivity. The inorganic solid electrolyte may include a crystalline solid electrolyte, a non-crystalline solid electrolyte and a glass ceramic solid electrolyte. In an embodiment of the present disclosure, the solid electrolyte may include a sulfide-based solid electrolyte, and the sulfide-based solid electrolyte may include, for example, lithium sulfide, silicon sulfide, germanium sulfide and boron sulfide. Specific examples of the inorganic solid electrolyte may be LLTO-based compound ($(La,Li)TiO_3$), $Li_6La_2CaTa_2O_{12}$, $Li_6La_2ANb_2O_{12}$ (A=Ca, Sr), $Li_2Nd_3TeSbO_{12}$, $Li_3BO_{2.5}N_{0.5}$, $Li_9SiAlO_8$, LAGP-based compound ($Li_{1+x}Al_xGe_{2-x}(PO_4)_3$, where $0 \leq x \leq 1$, $0 \leq y \leq 1$), LATP-based compound ($Li_{1+x}Al_xTi_{2-x}(PO_4)_3$, where $0 \leq x \leq 1$, $0 \leq y \leq 1$) such as $Li_2O$—$Al_2O_3$—$TiO_2$—$P_2O_5$, $Li_{1+x}Ti_{2-x}Al_xSi_y(PO_4)_{3-y}$ (where, $0 \leq x \leq 1$, $0 \leq y \leq 1$), $LiAl_xZr_{2-x}(PO_4)_3$ (where, $0 \leq x \leq 1$, $0 \leq y \leq 1$), $LiTi_xZr_{2-x}(PO_4)_3$ (where, $0 \leq x \leq 1$, $0 \leq y \leq 1$), LPS-based compound such as $Li_2S$—$P_2S_5$, $Li_{3.833}Sn_{0.833}As_{0.166}S_4$, $Li_4SnS_4$, $Li_{3.25}Ge_{0.25}P_{0.75}S_4$, $B_2S_3$—$Li_2S$, $xLi_2S$-(100-x)$P_2S_5$ (x is 70~80), $Li_2S$—$SiS_2$—$Li_3N$, $Li_2S$—$P_2S_5$—LiI, $Li_2S$—$SiS_2$—LiI, $Li_2S$—$B_2S_3$—LiI, $Li_3N$, LISICON, LIPON-based compound ($Li_{3+y}PO_{4-x}N_x$, where $0 \leq x \leq 1$, $0 \leq y \leq 1$), Thio-LISICON-based compound such as $Li_{3.25}Ge_{0.25}P_{0.75}S_4$, perovskite-based compound ($(La, Li)TiO_3$), NASICON-based compound such as $LiTi_2(PO_4)_3$ and LLZO-based compound including lithium, lanthanum, zirconium and oxygen as components, and may include one or more of these.

In a particular embodiment of the present disclosure, the conductive material may be, for example, one type of conductive material selected from the group consisting of graphite, carbon black, carbon fiber or metal fiber, metal powder, conductive whisker, conductive metal oxide, activated carbon and polyphenylene derive, or mixtures thereof. More specifically, the conductive material may be one selected from the group consisting of natural graphite, artificial graphite, super-p, acetylene black, ketjen black, channel black, furnace black, lamp black and thermal black, denka black, aluminum powder, nickel powder, zinc oxide, potassium titanate and titanium oxide, or mixtures thereof.

The current collector is not limited to a particular type when it has high conductivity while not causing a chemical change to the corresponding battery, and may include, for example, stainless steel, copper, aluminum, nickel, titanium, sintered carbon, or aluminum or stainless steel treated with carbon, nickel, titanium and silver on the surface.

Hereinafter, the present disclosure will be described in detail with reference to examples. The examples according to the present disclosure may, however, be modified in many different forms and should not be construed as limited to the examples described below. The examples of the present disclosure are provided to fully explain the present disclosure to those skilled in the art.

Example 1

<Preparation of a Nonwoven Fabric Precursor>

Polyacrylonitrile (Mn=100,000 g/mol) was dissolved in DMF to prepare 12 t % solution. After electrospinning (15 kV, the distance from a current collector plate: 10 cm) filaments from the prepared polymer solution in 500 ml of a methanol coagulation bath at the rate of 1.0 ml/min, a precipitated nonwoven fabric precursor was recovered and freeze-dried for 12 hours to obtain a nonwoven fabric precursor. The filaments having the diameter ranging from 500 nm to 2 μm were obtained in the nonwoven fabric precursor.

The electrospinning was performed using KD Scientific Inc. (model 100).

<Preparation of a Solid Electrolyte Membrane-Forming Slurry>

Inorganic solid electrolyte LPS($Li_2S$—$P_2O_5$) particles were introduced into xylene and mortar mixing was performed at the concentration of 30 wt % solids to obtain a uniform slurry.

<Preparation of a Nonwoven Fabric Precursor Impregnated with a Slurry>

The prepared nonwoven fabric precursor was introduced into the prepared slurry and mixed through mortar mixing to finally obtain a mixture in which the slurry is mixed between the filaments of the nonwoven fabric precursor. In this instance, the content of the inorganic solid electrolyte particles and the polymer filaments (polymer filaments that constitute the nonwoven fabric precursor) in the mixture was 80:20 in a weight ratio. The mixture was coated on a PET film using a doctor blade, the solvent was dried (60° C., 12 hr), and pressing process was performed using a hot press at 100° C. by a force of 300 Mpa. After the pressing process, the PET film was removed to finally obtain a solid electrolyte membrane having a nonwoven fabric-like structure, i.e., a 3-dimensional mesh structure in which the polymer filaments are entangled and arranged cross and linked to each other, such that the inner part of the mesh structure is filled with the inorganic solid electrolyte particles. The solid electrolyte membrane was 100 μm thick.

Example 2

Except the content of a solid electrolyte and polymer filaments in the solid electrolyte membrane-forming slurry was 75:25 in a weight ratio, a solid electrolyte membrane was prepared by the same method as example 1.

Comparative Example 1

Inorganic solid electrolyte LPS particles ($Li_2S$—$P_2O_5$) were dispersed in xylene to finally prepare a slurry with 38 weight % solids, and this was coated on a PET release film to the thickness of 200 μm. This was placed on a hot plate of 60° C. to remove the residual solvent, and a pressing process was performed using a hot press at 100° C. by a force of 300 MPa. A solid electrolyte membrane was obtained therefrom and its thickness was 100 μm.

Comparative Example 2

After coating the slurry prepared in comparative example 1 on a PET nonwoven fabric (porosity 40%, thickness 40 μm), the slurry was inserted into the PET nonwoven fabric through a pressing process of 300 Mpa using a hydraulic press (Carver, 4350L). A solid electrolyte membrane of 200 μm in thickness was finally obtained (solid electrolyte: nonwoven fabric=80:20 wt %). The obtained solid electrolyte membrane was not impregnated with the solid electrolyte slurry all along the thicknesswise direction of the nonwoven fabric and the inorganic solid electrolyte particles were only disposed on the nonwoven fabric surface.

Measurement of Ionic Conductivity

For each solid electrolyte membrane of examples 1 and 2 and comparative examples 1 and 2, electrochemical impedance spectroscopic analysis results were obtained under the conditions of amplitude of 10 mV and scan range of 0.1 hz to 1 Mhz at 25° C. using an analyzer (VMP3, Bio logic science instrument), and its results are summarized as shown in the following Table 1. To measure the ionic conductivity, each solid electrolyte membrane obtained in examples and comparative examples was interposed between a pair of SUS thin films.

TABLE 1

| | Example 1 | Example 2 | Comparative example 1 | Comparative example 2 |
|---|---|---|---|---|
| Ionic conductivity (S/cm) | $7.0 \times 10^{-4}$ | $6.7 \times 10^{-4}$ | $1.0 \times 10^{-3}$ | $2.0 \times 10^{-5}$ |

Evaluation of Durability

For each electrolyte membrane of examples and comparative examples, test was performed to determine if disconnection of the electrolyte occurs, by repeated bending and stretching deformations at the angle of 1800 to 90°. In the case of comparative example 1, disconnection of electrolyte particle occurred immediately at first deformation. In the case of comparative example 2, particle disconnection occurred at 4 or more deformations. In contrast, in the case of the solid electrolyte membranes of examples 1 and 2, particle disconnection did not occur even at repeated 30 or more deformations.

TABLE 2

| | Example 1 | Example 2 | Comparative example 1 | Comparative example 2 |
|---|---|---|---|---|
| Bending test (number) | 32 | 35 | 1 | 4 |

As can be seen from the above, the solid electrolyte membrane according to an embodiment of the present disclosure has high ionic conductivity and significantly reduces the particle disconnection problem. It was found that the solid electrolyte membrane according to an embodiment has a very uniform mix phase in which the solid electrolyte particles and the polymer filaments are mixed well, and the solid electrolyte is filled in the solid electrolyte membrane with high density. In the case of comparative example 2, when pressed, the solid electrolyte is not inserted into the nonwoven fabric well and the nonwoven fabric is compressed more tightly and thus has low porosity, resulting in insufficient impregnation of the solid electrolyte.

DESCRIPTION OF REFERENCE NUMERALS

10: Spinning apparatus
20: Polymer filament
30: Coagulant solution
100: Preliminary solid electrolyte membrane
40: Solid electrolyte membrane-forming slurry
50: Release plate
60a: Top pressing apparatus
60b: Support
200: Solid electrolyte membrane

What is claimed is:

1. A battery comprising an anode, a cathode and a solid electrolyte membrane interposed between the anode and the cathode, the solid electrolyte membrane comprising:
   a plurality of inorganic solid electrolyte particles; and
   a plurality of polymer filaments, wherein the plurality of polymer filaments are entangled and arranged crossed and linked to form a 3-dimensional mesh structure, the mesh structure is filled with the plurality of inorganic solid electrolyte particles along a thicknesswise direction, a content of the plurality of inorganic solid electrolyte particles in the solid electrolyte membrane ranges from 40 wt % to 90 wt % based on a total weight of the solid electrolyte membrane, and the solid electrolyte membrane has a porosity of 10 vol % or less.

2. The battery according to claim 1, wherein the plurality of polymer filaments comprise a polymer material selected from the group consisting of polyolefin, polyester, polyamide, polyacetal, polycarbonate, polyimide, polyetherketone, polyethersulfone, polyphenyleneoxide, polyphenylenesulfide, polyvinyledene fluoride, polyvinyl chloride, polyacrylonitrile, cellulose, polyparaphenylenebenzobisoxazole, and mixtures thereof.

3. The battery according to claim 1, wherein the plurality of inorganic solid electrolyte particles comprise a particle type comprising at least one of primary particles and secondary particles, said secondary particles comprising an agglomeration of primary particles.

4. The battery according to claim 1, wherein the plurality of polymer filaments have a diameter of 100 nm to 2 µm.

5. The battery according to claim 1, wherein the plurality of inorganic solid electrolyte particles comprise at least one of an oxide-based solid electrolyte and a sulfide-based solid electrolyte.

6. The battery according to claim 1, wherein the plurality of inorganic solid electrolyte particles and the plurality of polymer filaments are included in the solid electrolyte membrane at a weight ratio of 99:1 to 30:70.

7. The battery according to claim 1, wherein the solid electrolyte membrane has a porosity of 8 vol % or less.

8. The battery according to claim 1, wherein the solid electrolyte membrane has a porosity of 3 vol % or less.

9. The battery according to claim 1, wherein the solid electrolyte membrane has a porosity close to 0 vol %.

10. The battery according to claim 1, wherein the solid electrolyte membrane has an air permeability of 3,000 sec/100 cc or above.

11. A method for manufacturing the battery according to claim 1, comprising a method for manufacturing a solid electrolyte membrane, the method comprising:

preparing a nonwoven fabric precursor in which a plurality of polymer filaments are gathered;

preparing a solid electrolyte membrane-forming slurry;

obtaining a mixture in which the nonwoven fabric precursor and the solid electrolyte membrane-forming slurry are mixed;

drying the mixture to obtain a preliminary solid electrolyte membrane; and pressing the preliminary solid electrolyte membrane to obtain the solid electrolyte membrane, wherein the solid electrolyte membrane has a porosity of 10 vol % or less.

12. The method for manufacturing the battery according to claim 11, wherein the plurality of polymer filaments are obtained by spinning by an electrospinning method.

13. The method for manufacturing the battery according to claim 11, wherein the solid electrolyte membrane has a porosity of 8 vol % or less.

14. The method for manufacturing the battery according to claim 11, wherein the solid electrolyte membrane has a porosity of 3 vol % or less.

15. The method for manufacturing the according to claim 11, wherein the solid electrolyte membrane has an air permeability of 3,000 sec/100 cc or above.

* * * * *